United States Patent
Kotab

(10) Patent No.: US 8,521,826 B1
(45) Date of Patent: *Aug. 27, 2013

(54) SYSTEMS AND METHODS FOR PERFORMING AN ACTION RELATING TO AN EVENT

(76) Inventor: Dominic M. Kotab, San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/352,869

(22) Filed: Jan. 18, 2012

Related U.S. Application Data

(63) Continuation of application No. 12/612,559, filed on Nov. 4, 2009, now Pat. No. 8,122,094.

(60) Provisional application No. 61/111,672, filed on Nov. 5, 2008.

(51) Int. Cl.
*G06F 15/16* (2006.01)
*G06F 15/173* (2006.01)
*G06F 15/177* (2006.01)

(52) U.S. Cl.
USPC .............. 709/206; 725/58; 725/61; 725/87; 725/142

(58) Field of Classification Search
USPC .............. 709/206; 725/58, 87, 61, 142
See application file for complete search history.

(56) References Cited

U.S. PATENT DOCUMENTS

| | | | | |
|---|---|---|---|---|
| 7,716,705 | B2 * | 5/2010 | Berger et al. ................ | 725/58 |
| 2007/0050818 | A1 * | 3/2007 | Berger et al. ................ | 725/58 |
| 2008/0148320 | A1 * | 6/2008 | Howcroft ................ | 725/61 |
| 2008/0281665 | A1 | 11/2008 | Opaluch | |
| 2009/0007216 | A1 * | 1/2009 | Ku et al. ................ | 725/142 |
| 2009/0083807 | A1 | 3/2009 | Stephan et al. | |
| 2009/0187951 | A1 * | 7/2009 | McCarthy et al. ........... | 725/58 |
| 2009/0240647 | A1 * | 9/2009 | Green et al. ................ | 706/52 |
| 2010/0172628 | A1 * | 7/2010 | Berger et al. ................ | 386/83 |
| 2010/0333137 | A1 * | 12/2010 | Hamano et al. ........... | 725/39 |

OTHER PUBLICATIONS

Restriction Requirement from U.S. Appl. No. 12/612,559 dated Jan. 28, 2011.
Non-Final Office Action Summary from U.S. Appl. No. 12/612,559 dated Mar. 10, 2011.
Final Office Action Summary from U.S. Appl. No. 12/612,559 dated Aug. 5, 2011.
Notice of Allowance and Fee(s) Due from U.S. Appl. No. 12/612,559 dated Oct. 18, 2011.

* cited by examiner

*Primary Examiner* — Haresh N Patel
(74) *Attorney, Agent, or Firm* — Zilka-Kotab, PC

(57) ABSTRACT

A method according to one embodiment includes causing a message to be sent from a remote site to a user device, the message including information about a pay-per-view show and a hyperlink associated with the pay-per-view show for selection by a user; receiving data corresponding to a selection of the hyperlink in the message; outputting a webpage having a second hyperlink upon receiving the data corresponding to the selection of hyperlink; receiving data corresponding to a selection of the second hyperlink on the webpage; and performing an action in response to receiving the data corresponding to a selection of the second hyperlink on the webpage, the action comprising at least one of: ordering the pay-per-view show associated with the first or second hyperlink, and sending an instruction to a recording device to record the pay-per-view show.

33 Claims, 6 Drawing Sheets

SYSTEMS AND METHODS FOR PERFORMING AN ACTION RELATING TO AN EVENT

RELATED APPLICATIONS

This application is a continuation of U.S. patent application Ser. No. 12/612,559, filed Nov. 4, 2009, now U.S. Pat. No. 8,122,094, and claims priority to U.S. provisional patent application No. 61/111,672, filed Nov. 5, 2008, and which are herein incorporated by reference.

BACKGROUND

Manual event scheduling has become widespread in the area of television programming. For example, a user may schedule the recording of a future television programming event utilizing a digital video recorder (DVR). However, modern event scheduling lacks integration with other systems, e.g., systems such as calendar systems, electronic mail message systems, reminder systems, advertising systems, etc.

There is thus a need for addressing these and/or other issues and voids associated with the prior art.

SUMMARY

A method according to one embodiment includes causing a message to be sent from a remote site to a user device, the message including information about a pay-per-view show and a hyperlink associated with the pay-per-view show for selection by a user; receiving data corresponding to a selection of the hyperlink in the message; outputting a webpage having a second hyperlink upon receiving the data corresponding to the selection of hyperlink; receiving data corresponding to a selection of the second hyperlink on the webpage; and performing an action in response to receiving the data corresponding to a selection of the second hyperlink on the webpage, the action comprising at least one of: ordering the pay-per-view show associated with the first or second hyperlink, and sending an instruction to a recording device to record the pay-per-view show.

A system according to one embodiment includes a processor for causing a message to be sent from a remote site to a user device, the message including information about a pay-per-view show and a hyperlink associated with the pay-per-view show for selection by a user; logic for receiving data corresponding to a selection of the hyperlink in the message; logic for outputting a webpage having a second hyperlink upon receiving the data corresponding to the selection of the hyperlink; logic for receiving data corresponding to a selection of the second hyperlink on the webpage; and logic for performing an action in response to receiving the data corresponding to a selection of the second hyperlink on the webpage, the action comprising at least one of: ordering the pay-per-view show associated with the first or second hyperlink, and sending an instruction to a recording device to record the pay-per-view show.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the systems and apparatus of the invention, as generally described above. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
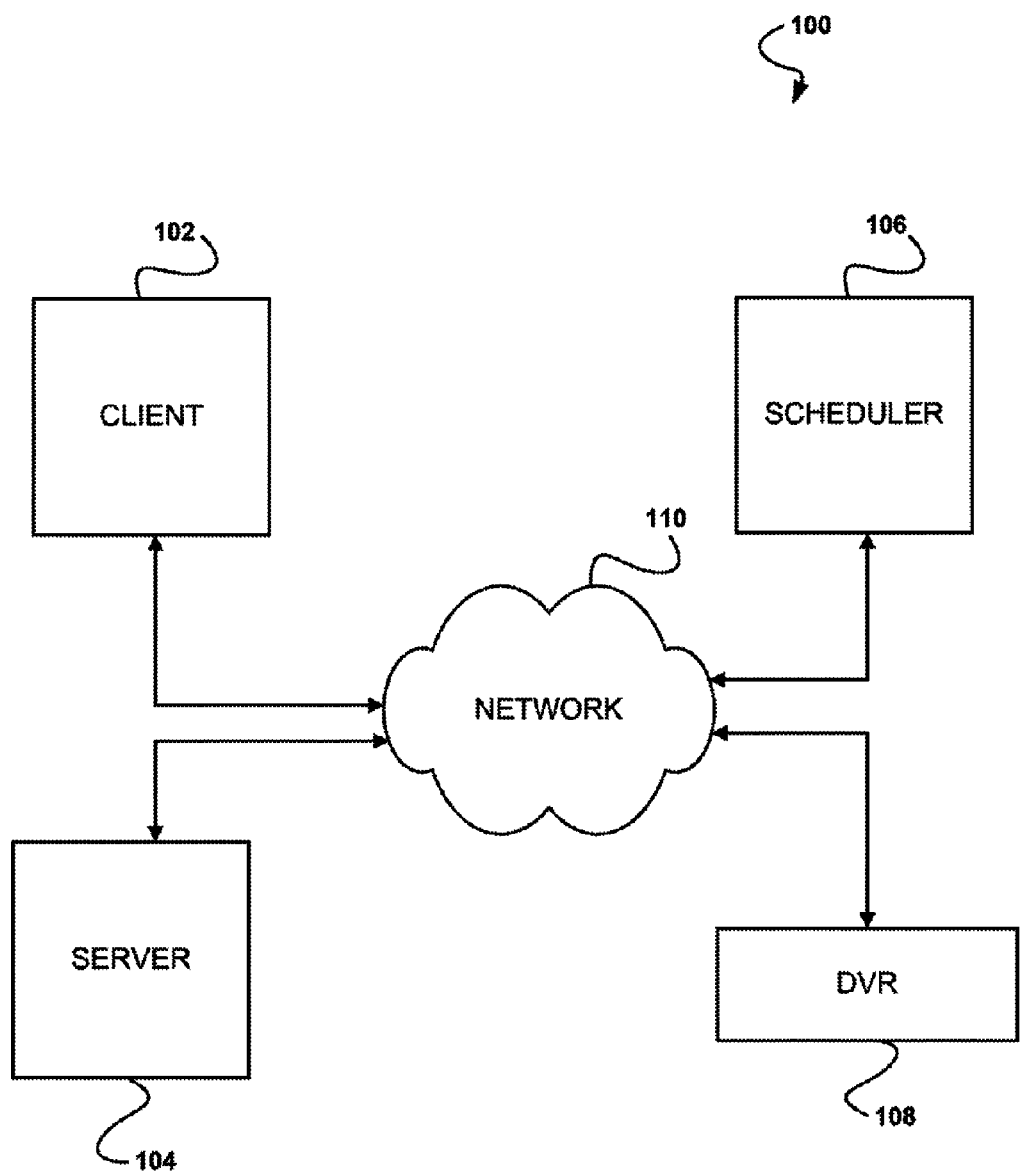
FIG. 1 illustrates a system architecture, in accordance with one illustrative embodiment.

FIG. 1 illustrates a system architecture 100, in accordance with one embodiment. In various implementations, systems implementing various aspects of the following features may include some or all of the components of system architecture 100. As shown, a client 102, a server 104, a scheduler 106, and a digital video recorder (DVR) 108 are capable of communicating via a network 110. In the context of the present system architecture 100, the network 110 may take any form including, but not limited to a local area network (LAN), a wireless network, a wide area network (WAN) such as the Internet, a peer-to-peer network, a cable television network, etc. and combinations thereof.

In addition, the client 102 and/or server 104 may each include a desktop computer, a lap-top computer, a hand-held computer, a mobile phone, a personal digital assistant (PDA), a peripheral (e.g., printer, scanner, display, etc.), any component of a computer, and/or any other type of logic. Further, the scheduler 106 may include any device capable of scheduling a DVR 108 or sending a request or command to schedule a DVR to a DVR or any intermediary device. Also, the DVR 108 may be any type of device that is capable of receiving and recording video data based on one or more received commands. For example, a DVR 108 may be a computer which is connected to the Internet for streaming and recording television programs from network websites. In another example, a DVR 108 may be a set-top box that is capable of receiving a cable or satellite signal, translate the signal into a displayable picture, and record the displayable picture or native signal for displaying at a later time, either in local or remote memory.

Figure 2:
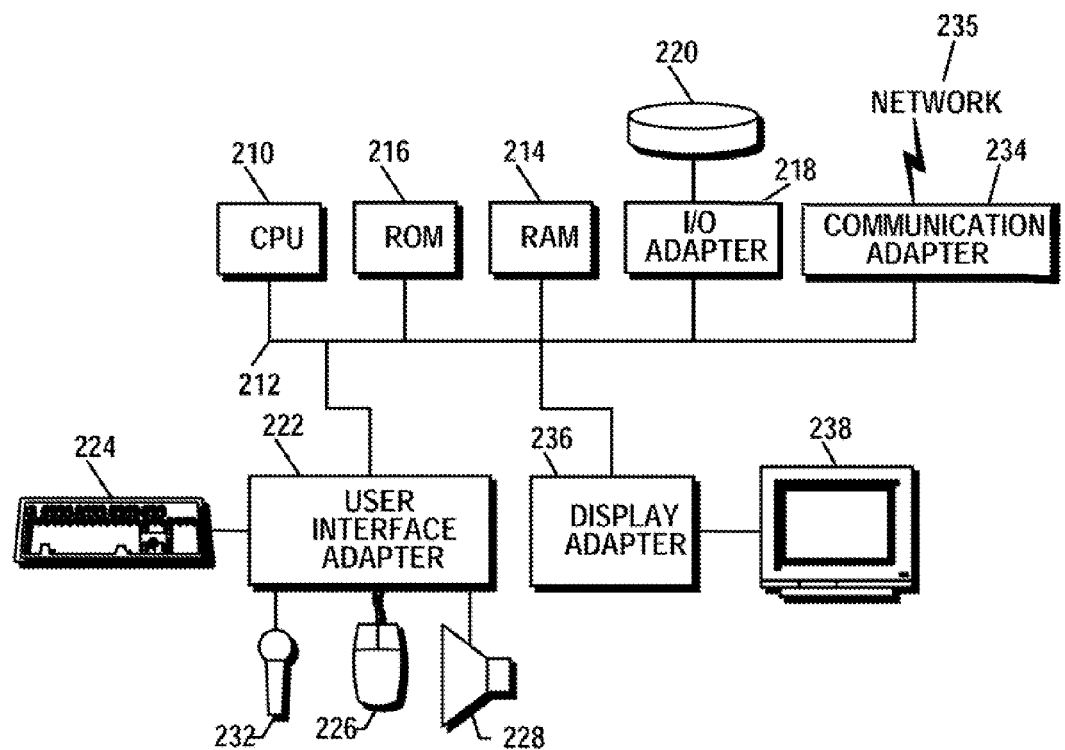
FIG. 2 shows a representative hardware environment, in accordance with one illustrative embodiment.

FIG. 2 shows a representative hardware environment that may be associated with the client 102, server 104, scheduler 106, and/or DVR 108 of FIG. 1, in accordance with one embodiment. FIG. 2 illustrates a typical hardware configuration of a workstation in accordance with one embodiment having a central processing unit (CPU) 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system (OS). A WINDOWS, MAC, UNIX, LINUX, or any other OS may be used as the OS. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
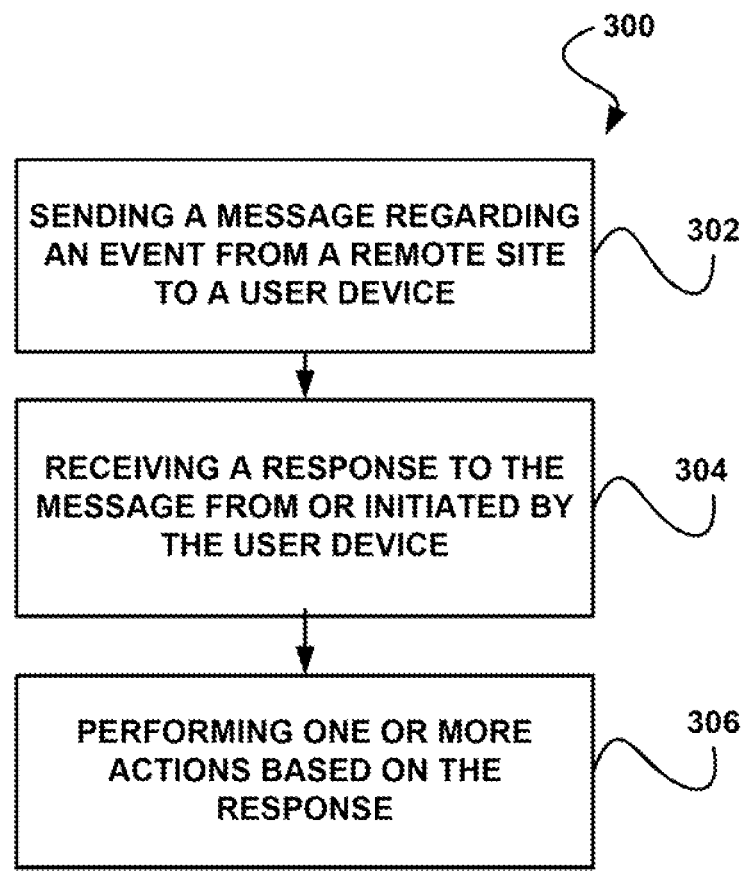
FIG. 3 shows a method for performing an action relating to the scheduling of an event, in accordance with one illustrative embodiment.

FIG. 3 shows a method 300 for performing an action relating to the scheduling of an event, in accordance with one embodiment. As an option, the method 300 may be carried out in the context of the architecture and environment of FIGS. 1 and/or 2. Of course, however, the method 300 may be carried out in any desired environment.

As shown in operation 302, a message regarding an event is sent from a remote site to a user device. The event may include any type of programming able to be viewed and/or recorded on a DVR or other recording device. In one embodiment, the event may be a show. For example, the event may be a show airing on a television network (such as CSI, LAW & ORDER, 20/20, a sports event, etc.), a pay per view show (such as a UFC fight, a newly released motion picture, etc.), a show on a subscription network (such as Home Box Office (HBO), SHOWTIME, etc.), a web-based show, a recurring show (such as a nightly news program, a game show, a scripted drama series, etc.), a one-time show (such as a boxing match, football game, etc.), etc. Additionally, in another embodiment, the event may include a collection of shows such as a series, miniseries, marathon of shows, etc.

In addition, the message may include any type of communication capable of being transmitted to the user device. For example, the message may include an electronic mail message, a text message, an instant message (IM), a telephone call allowing user selection using the number keypad or verbal responses, etc. The communication may also appear as a hyperlink embedded in another message (such as an electronic mail message), such that the user can click on the link to access a website which includes the message and other information/interactive features.

In one embodiment, the message may include a list of shows for selection by the user. The list of shows may be compiled based on any type of criterion, such as title, actor, producer, channel, date, genre, etc. In one approach, the list may be created based on a keyword or type of show, such as "sports," "drama," "Friends," etc. In another approach, the list may be precompiled by the user or based on some criteria defined by the user. In yet another approach, the list may be compiled based on user tendencies, such as past user selections, interactions, etc.

In another embodiment, the message may contain one or more hyperlinks. In one approach, selection of a hyperlink may generate a response or may assist in generating a response. In another approach, selection of a hyperlink may cause output of more information about the event, e.g., via a webpage, via additional messages, etc.

In one embodiment, only one action is required from a user to cause the recording. For instance, the message may have a link or button that the user may select. Upon the user selecting the link or button, an action is automatically performed, such as setting a reminder on the DVR, scheduling a recording of the show on the DVR, purchasing the show, sending the show to the DVR as a recorded show, etc.

In still another embodiment, whether the message is sent may be based on one or more user preferences. For example, the user may elect to receive the messages, the user election being received and stored. Of course, messages may be distributed based on any criteria, such as user tendencies, user location, system type, etc. In another approach, the system may recognize that the user has opted out of receiving certain messages, types of messages, etc., and may not send certain types of messages.

Furthermore, the remote site may include any type of device or system capable of sending a message. As an option, the remote site may include the server 104 as described in FIG. 1. Additionally, the user device may include any device capable of receiving a message, such as a computer, a mobile phone, a home telephone, a PDA, etc. As an option, the user device may include the client 102 as described in FIG. 1.

Additionally, as shown in operation 304, a response to the message is received from the user device, or a response initiated by the user device, typically at the request of the user. In one embodiment, the response may include an electronic mail message, text message, etc. In another embodiment, the response may include one or more user selected shows. In still another embodiment, the response may be received upon the selection of a hyperlink that may be sent in a message to the user, selectable on a website, etc. Of course, in another embodiment, the response may be routed through any intermediary device or system prior to being received, such as through servers, routers, etc. The response may also be generated based on input from a user, such as selection of a link in a message, a received telephone call from a user device, a received text or email message from the user device, etc.

Further still, as shown in operation 306, one or more actions are performed based on the response. The actions may be selected from a group consisting of ordering a pay-per-view show (which may include purchasing the pay-per-view show), scheduling a recording of a show, and sending a reminder of the event to the user device or another user device (and possibly to the DVR for display when the show time nears). In one embodiment, purchasing a pay-per-view show may include one or more of sending a credit card number retrieved from the response, sending a user account number, sending PAYPAL account information or the like, and sending a title or other identifier (such as an alphanumeric sequence denoting the program to be purchased) of a selected pay-per-view show.

In another embodiment, the recording of the user-selected show may be scheduled at or requested from the remote site. For example, the remote site may then instruct a DVR to record the show. The instruction may include any information needed for the DVR to identify the show, such as program identifier, name of the show, time slot, channel, network, etc. In still another embodiment, the recording of the user-selected show may be scheduled at a scheduler device, e.g., a DVR, a remote server such as a DVR service provider site, etc.

The reminder may be any message, note, calendar entry, etc., that is indicative of the event. Moreover, the reminder may include time and/or date data relating to the event, e.g., when the event is to happen or be broadcast, etc. In addition, the reminder of the event may enable adding the event to a calendar such as a MICROSOFT OUTLOOK calendar. In another embodiment, the reminder of the event may include a link for recording the event. For example, the selection of the link may be recognized, and a recording of the event may be scheduled.

Furthermore, the reminder may be triggered after an initial airing of the show if it would conflict with other activity on the DVR and/or other equipment. The DVR and/or remote site may search for another airing of the show which it could then record and/or trigger a reminder. In this way, the remote site and/or DVR could "intelligently" avoid conflicts with other operations.

The DVR can be identified and/or communicated with using any type of suitable service, method or protocol. For example, the appropriate system may know the network address of the DVR. In another approach, the DVR may check for instructions or requests upon occurrence of some event such as expiration of a period of time, reaching a certain time of day, receiving a notice to contact a remote server, etc.

Figure 4:
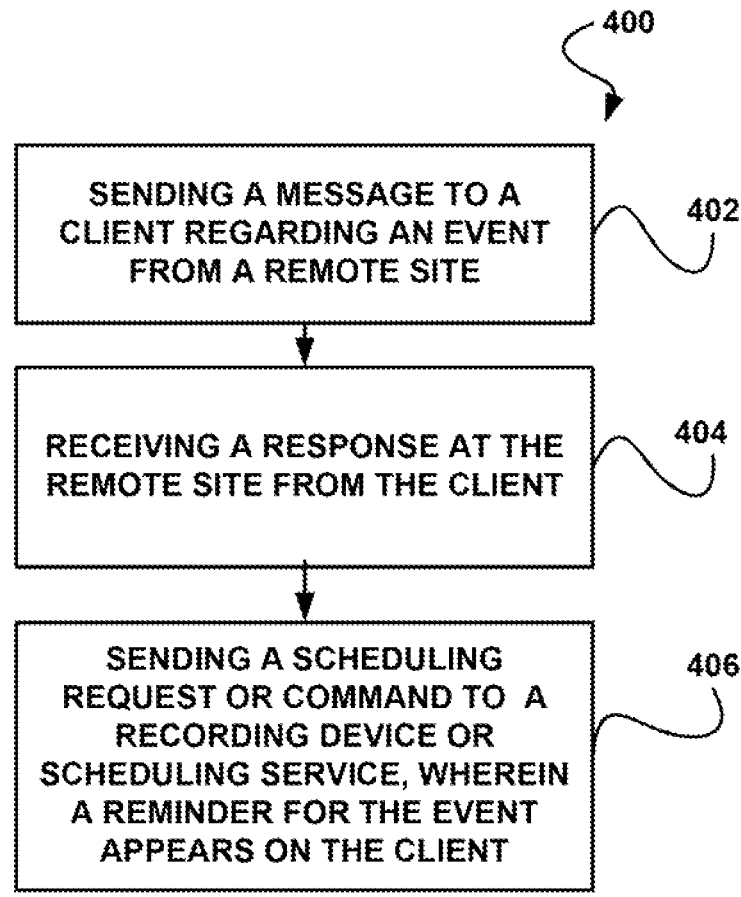
FIG. 4 shows a method for scheduling events, in accordance with another illustrative embodiment.

In accordance with another illustrative example, FIG. 4 shows a method 400 for scheduling events, in accordance with another illustrative embodiment. As an option, the method 400 may be implemented in the context of the architecture and environment of FIGS. 1, 2, and/or 3. Of course, however, the method 400 may be carried out in any desired environment.

As shown in operation 402, a message regarding an event is sent to a client from a remote site. In one embodiment, the message may contain a hyperlink. In another embodiment, the message may contain a list of shows for selection, possibly with hyperlinks embedded for each show. In still another embodiment, the message may include an advertisement and or notifying material describing an event. In addition, the message may include text, images, sound, visual effects, identifying marks for the shows (such as logos, symbols, etc.), selection criteria, show information, etc.

In some embodiments, the message may be directed to certain clients based on criteria, such as client tendencies, client location, client account information, event type, probability of client interest, etc.

Additionally, in operation 404 a response is received at the remote site from the client. The response may be sent by the client in any manner. For example, the response may be sent automatically through email if the message is received through email when the hyperlink is selected. In another example, the response may be sent when the message is replied to. In one embodiment, the response may include the selection of one or more shows from the list of shows. In more embodiments, the response may be triggered by selection of a hyperlink text in a message received by the client.

Furthermore, in operation 406, a scheduling request or command is sent to a recording device (e.g., DVR) or scheduling service, e.g., a DVR, a remote server such as a DVR service provider site, etc. Further still, a reminder for the event may appear on the client. The scheduling request may be any request relating to the scheduling of an event. For example, the scheduling request may include scheduling the recording of a television show on a DVR. In another example, the scheduling request may include scheduling the purchase of a pay-per-view show. In yet another example, the scheduling request may include scheduling the purchase of a subscription channel, such as HBO, SHOWTIME, etc. The purchase of the subscription channel may be for a fixed duration, e.g., as long as the show; for an indefinite duration, e.g., until the user cancels the purchase; etc.

In one embodiment, the reminder may be added to the calendar. In another embodiment, upon receiving the selection of one or more of the shows, the selected shows may be scheduled to be recorded, either locally or remotely, at the DVR.

Figure 5:
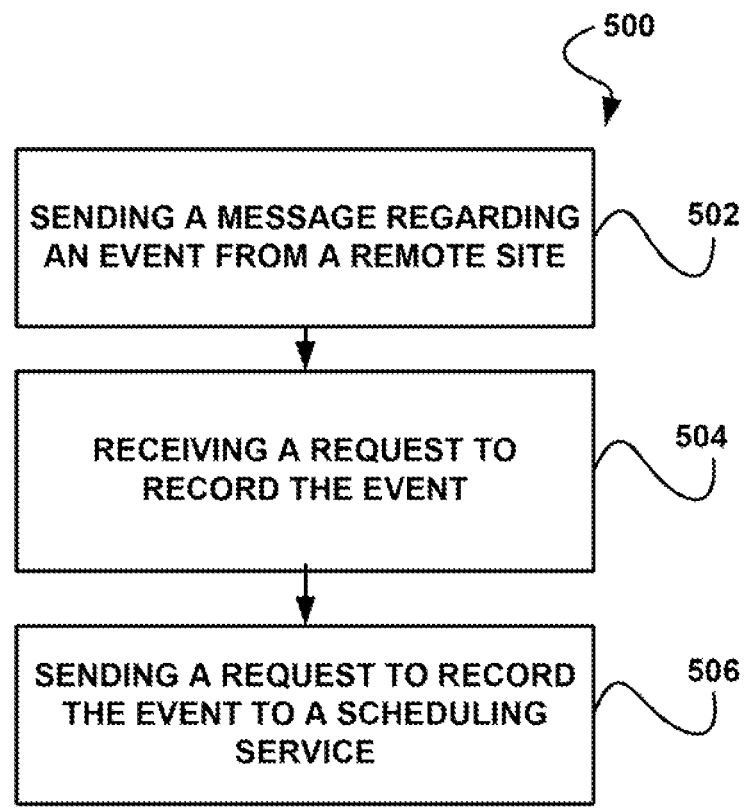
FIG. 5 shows a method for scheduling events, in accordance with yet another illustrative embodiment.

In yet another illustrative example, FIG. 5 shows a method 500 for scheduling events [server centric], in accordance with yet another illustrative embodiment. As an option, the method 500 may be implemented in the context of the architecture and environment of FIGS. 1-4. Of course, however, the method 500 may be carried out in any desired environment.

As shown in operation 502, a message regarding an event is sent from a remote site. In one embodiment, the message may include user account information, event information, date, time, space requirements, cost, etc. In another embodiment, the event may comprise one or more shows selected by a user. In some embodiments, the message may be sent to any intermediary, such as a router, server, etc., for achieving receipt of the message by the intended target.

Additionally, in operation 504 a request is received to record the event. In one embodiment, recording the event may include saving a copy of the event on a DVR. In addition, the request may be received in any manner and through any intermediary. For example, the request may include an electronic mail message. In another example, the request may include a reply to an electronic mail message regarding the event. In yet another example, the request may be output from a telephone keypad denoting a desire by a user (for example, "press 6 if you want to record this program," and the user presses 6, which is received and triggers recording the program).

Furthermore, in operation 506 a request to record the event is sent to a scheduling service. In one embodiment, the request to record the event may be a request to instruct a DVR to record one or more shows. In addition, the scheduling service may include any service capable of performing or causing the scheduling of one or more events. The scheduling service may be local at the DVR or remote at another site with remote access to the DVR through telephone lines, cable lines, etc. For example, the scheduling service may include a television service provider, a television programming provider, a scheduling web site, a DVR management utility, etc. Moreover, the scheduling service may send instructions directly to a DVR to record the one or more shows. Also, the DVR or scheduling service may resolve any conflicts with currently scheduled recordings by searching for and scheduling duplicate broadcasts or rebroadcasts of any of the scheduled recorded shows at a later or earlier time.

Figure 6:
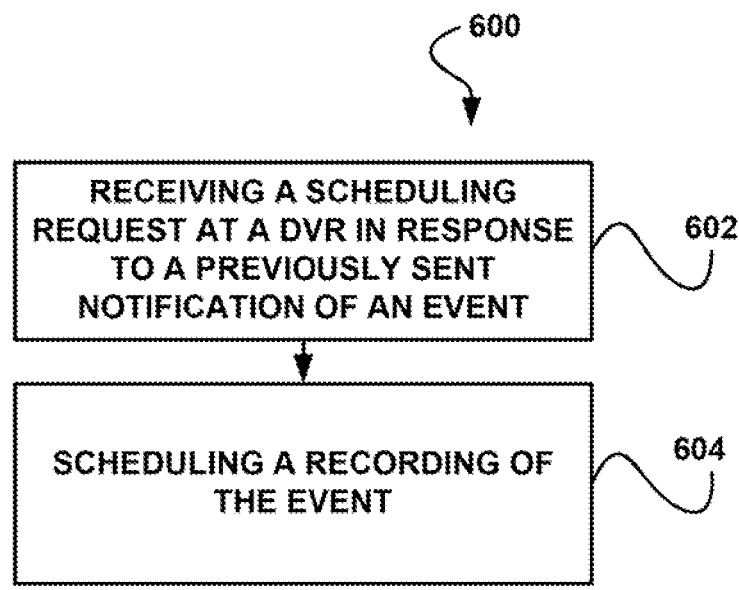
FIG. 6 shows a method for scheduling events, in accordance with another illustrative embodiment.

In still another illustrative example, FIG. 6 shows a method 600 for scheduling events, in accordance with another illustrative embodiment. As an option, the method 600 may be implemented in the context of the architecture and environment of FIGS. 1-5. Of course, however, the method 600 may be carried out in any desired environment.

As shown in operation 602, a scheduling request is received by a DVR in response to a previously sent notification of an event. The scheduling request may be received from any module capable of sending a scheduling request. In one embodiment, the scheduling request may be received from a client. In another embodiment, the scheduling request may be received upon the selection of a hyperlink. In still another embodiment, the scheduling request may be sent by a server, by a user, by an intermediary, etc.

Additionally, in operation 604 the DVR schedules to record the event. For example, the DVR may be scheduled to record a particular event. In another example, a series recording may be scheduled by the DVR as the result of the request. In still another example, a pay-per-view event or subscription channel may be purchased by the DVR as a result of the request.

In yet another example, only certain types of events may be set to be recorded, such as only new events of a certain type (new episodes of CSI, but not rebroadcasts of CSI), only free events of a certain type (e.g., boxing programs free of additional charges, but not pay-per-view boxing events), only events available to a user under current subscription (e.g., football games on network channels, but not football games on NFL SUNDAY TICKET), etc.

In yet another illustrative example, a method for scheduling events, in accordance with another illustrative embodiment is provided. In operation, a message, e.g., email message, text message, etc., regarding a televised event may be sent from a remote site to a user device, the message including a mechanism (e.g., hyperlink to a web page, to a site indicating an affirmation to initiate a request to record the event, etc.) for allowing a user to request recording of the event, where a process for recording the event is initiated upon the user requesting recording of the event, e.g., upon the user triggering the mechanism. Note that the process for recording the event may be performed by the remote site, third party, DVR, etc.

In one approach, a web page may be opened upon the user selecting a hyperlink in the message. The web page may include such things as recording options for selection by the user, similar events that might interest the user, etc. More options that may be found on such a web page are provided below.

In some embodiments, the events may be cached and/or recorded at a remote site instead of being recorded by a user's DVR. The cached or recorded shows may then be downloaded to a DVR, receiver, television, etc. for output to the user. Note that the downloading may occur during the caching or recording, or thereafter.

Thus, any of the embodiments described or implied herein may use a remote site to store the event instead of, or in conjunction with, a DVR or other output device. For example, the DVR device described above and/or functionality described in conjunction therewith may reside on a remote site (e.g., remote from the user's domicile or service address, remote from the user's DVR or receiver) such as the server 104, another networked server or storage device, etc. Moreover, a list of events stored on the remote site may be sent to the user device and/or DVR, receiver, etc. e.g., for allowing user selection via the respective device of one or more events to download to the DVR, receiver, etc.

In one example in conjunction with FIG. 1, the event may be cached or recorded at a remote site in response to the response received from the user device. In another example in conjunction with FIG. 4, the recording device noted in operation 406 may be located at a remote site. In yet another example in conjunction with FIG. 5, the scheduling service of operation 506 may send a second request to record the event to a remote site for recording the event at the remote site. In a further example, a process for recording an event initiated upon the user requesting recording of the event may include sending a request to record the event to a remote site for recording the event at the remote site. These examples further demonstrate that various features of the embodiments described herein may be combined to create many more permutations and embodiments than the embodiments provided herein by way of example.

While the present invention has been illustrated and described with reference to specific embodiments, further modification and improvements may occur to those of reasonable skill in the relevant art. The present description has thus been presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative systems of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented using a variety of technologies. For example, the systems described herein may be implemented in software running on a computer system, or implemented in hardware utilizing either a combination of microprocessors or other specially designed application specific integrated circuits, programmable logic devices, or various combinations thereof. In particular, systems described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily-adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including physical media such as optical media such as read only and writeable/rewriteable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Additionally, some or all of the aforementioned code may be embodied on any computer readable storage media including tape, flash memory, system memory, hard drive, etc. Additionally, a data signal embodied in a carrier wave (e.g., in a network including the Internet) can be the computer readable storage medium.

EXAMPLES

The following examples are provided by way of nonlimiting example only. These examples are not meant to limit the scope and breadth of the invention in any way.

In one illustrative embodiment, assume a message regarding an event is sent to a user device, where it is output to the user. The user is interested in the event and so wants to set a reminder. A response is received from the user device requesting sending of a reminder regarding an event. A reminder is sent to the user device in the form of an invitation. The user accepts the invitation, and a reminder now appears on a calendar on the user device. As the date of the event approaches, the reminder may pop up to remind the user of the event, allow the user to select a link to request recording of the event, "snooze" the reminder so it reappears later, etc. Upon receiving selection of the link, a message may be sent to the user's DVR with a command to record the program. If the program conflicts with a previously scheduled recording, a note may be sent back to the user to that effect and/or to request instructions. Alternatively, the option of giving the event priority may be provided.

In another illustrative embodiment, assume a message regarding an event is sent to a user device, where it is output to the user. The user wants to record the event and so selects a link in the message. A response is received from the user device (upon selection of the link) indicating that the user would like to record the event. A request to record the event is sent to a DVR associated with the user. A confirmation that the response has been received, that the program will or will not be recorded, etc. may be sent to the user device. As an option, a reminder may also be sent to the user device.

In yet another illustrative embodiment, assume a user has signed up to receive email newsletters from a mixed martial arts (MMA) promotion organization. An email message regarding an MMA event and/or several related programs is sent to a user device, where it is output to the user including hyperlinks. For instance, the main event may be listed on the message, as well as the program showing the weigh-in, and a program which discusses the athletes competing in the event. Assume in scenario A, the user wants to record the main event and so selects the main event hyperlink in the message. A response is received from the user device (upon selection of the hyperlink) indicating that the user would like to record the main event. A web page is opened allowing the user to select options such as time slot of the event (assuming multiple showings), recording quality, priority of the recording relative to previously scheduled recordings, whether to add time to the recording (e.g., live events tend to run longer than their allotted time slot), which DVR to record on, enter login information, etc. A request to record the main event is sent to a DVR associated with the user. A confirmation that the response has been received, that the program will or will not be recorded, etc., may be sent to the user device or other location. As an option, a reminder may also be sent to the user device. Assume in scenario B, the user wants to record a plurality of the aforementioned programs. Selection of a "record all programs" link or other indication of which of the programs to record is received. The process proceeds as above, except all selected shows are recorded. Assume in scenario C that the event is a pay-per-view program, as many MMA matches may be. The user, when selecting the button activating the recording function of the DVR will simultaneously authorize the associated charges for viewing the program to be included in the next monthly bill. A webpage may open indicating the price of the program, any associated fees and costs, and a total price for purchase which may have a link embedded which once again asks for the user's acceptance. Once the user accepts the purchase price, the process proceeds as above in scenario A.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed:

1. A method, comprising:
causing a message to be sent from a remote site to a user device, the message including information about a pay-per-view show and a hyperlink associated with the pay-per-view show for selection by a user;
receiving data corresponding to a selection of the hyperlink in the message;
outputting a webpage having a second hyperlink upon receiving the data corresponding to the selection of hyperlink;
receiving data corresponding to a selection of the second hyperlink on the webpage; and
performing an action in response to receiving the data corresponding to a selection of the second hyperlink on the webpage, the action comprising at least one of:
ordering the pay-per-view show associated with the first or second hyperlink, and
sending an instruction to a recording device to record the pay-per-view show.

2. The method of claim 1, wherein the message is an electronic mail message.

3. The method of claim 1, further comprising sending a reminder of the event to the user device or a different user device, wherein the reminder enables adding the event to a computerized calendar as a calendar entry.

4. The method of claim 1, wherein the show is a single show.

5. The method of claim 4, wherein the show is a live event.

6. The method of claim 4, wherein the show is a movie.

7. The method of claim 1, wherein the show is a collection of shows.

8. The method of claim 1, wherein the message includes a list of shows for selection by the user.

9. The method of claim 1, wherein whether the message is sent is based on user preferences.

10. The method of claim 1, wherein the action includes the ordering the pay-per-view show.

11. The method of claim 1, wherein the action includes the sending the instruction to a recording device to record the pay-per-view show.

12. The method of claim 1, wherein the action includes both the ordering the pay-per-view show and the sending the instruction to a recording device to record the pay-per-view show.

13. The method of claim 1, wherein the message is a text message.

14. The method of claim 1, further comprising sending a confirmation regarding the action to the user device.

15. The method of claim 1, wherein the webpage indicates a price of the pay-per-view show, wherein selection of the second hyperlink on the webpage indicates acceptance by the user of the price.

16. The method of claim 1, wherein the webpage includes recording options.

17. A system, comprising:
   a processor for causing a message to be sent from a remote site to a user device, the message including information about a pay-per-view show and a hyperlink associated with the pay-per-view show for selection by a user;
   logic for receiving data corresponding to a selection of the hyperlink in the message;
   logic for outputting a webpage having a second hyperlink upon receiving the data corresponding to the selection of the hyperlink;
   logic for receiving data corresponding to a selection of the second hyperlink on the webpage; and
   logic for performing an action in response to receiving the data corresponding to a selection of the second hyperlink on the webpage, the action comprising at least one of:
      ordering the pay-per-view show associated with the first or second hyperlink, and
      sending an instruction to a recording device to record the pay-per-view show.

18. The system of claim 17, wherein the message is an electronic mail message.

19. The system of claim 17, further comprising logic for sending a reminder of the event to the user device or a different user device, wherein the reminder enables adding the event to a computerized calendar as a calendar entry.

20. The system of claim 17, wherein the show is a single show.

21. The method of claim 20, wherein the show is a live event.

22. The method of claim 20, wherein the show is a movie.

23. The system of claim 17, wherein the show is a collection of shows.

24. The system of claim 17, wherein the message includes a list of shows for selection by the user.

25. The system of claim 17, wherein whether the message is sent is based on user preferences.

26. The system of claim 17, wherein the action includes the ordering the pay-per-view show.

27. The system of claim 17, wherein the action includes the sending the instruction to a recording device to record the pay-per-view show.

28. The system of claim 17, wherein the action includes both the ordering the pay-per-view show and the sending the instruction to a recording device to record the pay-per-view show.

29. The system of claim 17, wherein the message is a text message.

30. The system of claim 17, further comprising sending a confirmation regarding the action to the user device.

31. The system of claim 17, wherein the webpage indicates a price of the pay-per-view show, wherein selection of the second hyperlink on the webpage indicates acceptance by the user of the price.

32. The system of claim 17, wherein the webpage includes recording options.

33. The system of claim 17, further comprising hardware configured with at least some of the logic.

\* \* \* \* \*